Aug. 3, 1926.
J. ERICKSON
LUBRICATOR
Filed April 14, 1924
1,594,713
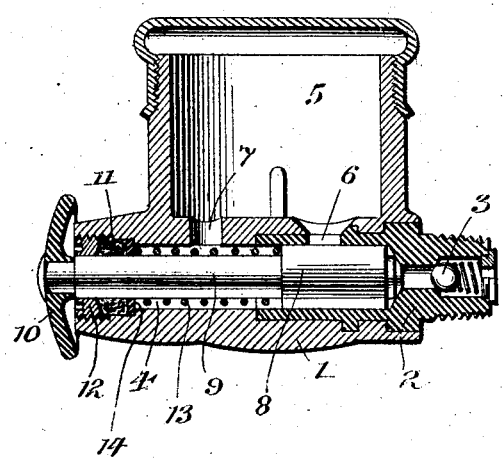
Inventor
John Erickson Patented Aug. 3, 1926.

1,594,713

UNITED STATES PATENT OFFICE.

JOHN ERICKSON, OF MADISON, WISCONSIN, ASSIGNOR TO MADISON KIPP CORPORATION, OF MADISON, WISCONSIN, A CORPORATION OF WISCONSIN.

LUBRICATOR.

Application filed April 14, 1924. Serial No. 706,609.

This invention pertains to lubricators, and more particularly to the force feed type wherein a piston is employed to eject a charge that passes into a cylinder from a superimposed reservoir.

In Letters Patent No. 1,359,584, granted to me under date of November 23rd, 1920, there is shown a structure wherein it was sought, by the provision of a groove extending around the inner wall of the cylinder and opening into the inlet port through which the lubricant or oil was fed to the cylinder, to prevent the passage of oil backward along the face of the piston and to the rear thereof; this with a view of preventing any oil from passing along the piston rod and outwardly thereof, where it would come into contact with the hands of the operator.

While such a construction is more or less advantageous for the purpose in view, I have found that ultimately the oil will work back of the piston and consequently out along the piston rod and finally onto the operating handle, which of course is objectionable.

The present invention has for its object the provision of means whereby the presence of oil upon the piston rod may be obviated.

The invention is shown in the annexed drawing wherein the lubricator is shown in longitudinal sectional elevation.

In the drawing, 1 denotes a shell in which is mounted a bushing 2, the outer end of which extends beyond the shell, and is shown as threaded for connection to the part to be lubricated or to a pipe leading thereto. A check valve 3 is seated in this extension and prevents retrograde flow of the oil when the piston of the lubricator is moved rearwardly. A cylinder, as 4, is formed in the shell, said cylinder being produced by boring out the shell and likewise boring out the bushing, though of course, in so far as the present invention is concerned, the cylinder might be formed entirely within the shell and no bushing employed. Overlying the cylinder and preferably formed as an integral part of the shell is a reservoir 5, the lower wall of which is provided with two ports 6 and 7, which open directly into the cylinder 4.

A piston 8 is mounted for reciprocation in the cylinder, and a piston rod 9 extends therefrom and is provided with a handle 10 at its outer end. The rear portion of the shell 1 is internally threaded in line with the cylinder, and a suitable packing 11 is inserted in this opening and held in place by a packing gland 12 through which piston rod or stem 9 passes.

It will thus be seen that the oil will flow by gravity through the port 7 into the space in rear of the piston 8 when the piston is in its forward position where it is normally held by a spring 13 encircling the rod 9, and bearing at one end on the rear face of the piston and at its opposite end against a washer 14 placed in front of the packing 11.

Upon drawing the piston rearwardly, by pulling upon the handle 10, the oil within the cylinder in rear of the piston will be forced upwardly through the port 7 and will not be forced outwardly along the rod 9 by reason of the fact that the packing offers more resistance to its passage than does the weight of the oil in the reservoir 5. When drawn outwardly, piston 8 uncovers the port 6, allowing a charge of oil to pass through said port into the cylinder in front of the piston, the opening 7 still remaining open or partially so. Upon release of the handle the spring will force the piston forwardly and eject the oil past the valve 3 and outwardly from the projection or extension 2. At such time the oil will again gravitate through the port 7 into the space in rear of the piston.

It is found that this arrangement of the re-flow port 7 obviates the difficulty which was sought to be obviated, and was obviated to a greater or less extent, by the structure shown in my former patent above alluded to.

The spring may of course be omitted and the piston manually operated in both directions.

What I claim is:

1. In a lubricator the combination of a cylinder having a discharge port; a reservoir surmounting the same; a piston mounted for reciprocation in the cylinder; a piston rod extending outwardly from the piston and through the rear portion of the cylinder; and a packing surrounding the rod adjacent the rear end of the cylinder and serving to prevent the passage of oil outwardly along the rod, the reservoir being provided with two laterally extending ports opening directly into the cylinder adjacent the opposite ends thereof, that port located adjacent the rear end of the cylinder being in free communication therewith and with the reservoir at all times.

2. In a lubricator the combination of a shell having a cylinder extending longitudinally thereof and communicating at one end with a discharge port; a reservoir surmounting the shell with a pair of laterally extending ports opening from the bottom of the reservoir directly into the cylinder adjacent opposite ends thereof; a piston mounted for reciprocation in said cylinder; a piston rod extending outwardly through the cylinder; a packing secured in the rear end of the cylinder and surrounding the rod; and a spring encircling the rod and acting to force the piston forwardly in the cylinder, the rear of the laterally extending ports or that located adjacent the rear end of the cylinder being in free communication therewith and with the reservoir at all times.

In testimony whereof I have signed my name to this specification.

JOHN ERICKSON.